US008529346B1

(12) United States Patent
Johnston (10) Patent No.: US 8,529,346 B1
(45) Date of Patent: Sep. 10, 2013

(54) ALLOCATING AND MANAGING SOFTWARE ASSETS

(75) Inventor: Eric R. Johnston, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 932 days.

(21) Appl. No.: 12/319,083

(22) Filed: Dec. 30, 2008

(51) Int. Cl.
*A63F 9/24* (2006.01)

(52) U.S. Cl.
USPC .............. 463/41; 463/42; 463/16; 463/31; 717/162; 717/154; 348/36; 348/732

(58) Field of Classification Search
None
See application file for complete search history.

(56) References Cited

U.S. PATENT DOCUMENTS

| | | | | |
|---|---|---|---|---|
| 5,016,876 A * | 5/1991 | Loffredo | | 463/33 |
| 5,976,017 A * | 11/1999 | Omori et al. | | 463/32 |
| 6,883,167 B1 * | 4/2005 | Szewerenko et al. | | 717/162 |
| 7,337,201 B1 * | 2/2008 | Yellin et al. | | 1/1 |
| 7,445,551 B1 * | 11/2008 | Okada et al. | | 463/43 |
| 7,688,346 B2 * | 3/2010 | Richards | | 348/36 |
| 7,719,563 B2 * | 5/2010 | Richards | | 348/36 |
| 7,762,891 B2 * | 7/2010 | Miyamoto et al. | | 463/31 |
| 2001/0047512 A1 * | 11/2001 | Szewerenko et al. | | 717/10 |
| 2002/0086730 A1 * | 7/2002 | Nakai | | 463/41 |
| 2003/0073497 A1 * | 4/2003 | Nelson | | 463/42 |
| 2003/0092492 A1 * | 5/2003 | Ishii et al. | | 463/42 |
| 2003/0109313 A1 * | 6/2003 | Gavin | | 463/43 |
| 2004/0073912 A1 * | 4/2004 | Meza | | 719/321 |
| 2004/0224774 A1 * | 11/2004 | Nakai | | 463/42 |
| 2004/0259636 A1 * | 12/2004 | Machida | | 463/30 |
| 2005/0119050 A1 * | 6/2005 | Suzuki | | 463/36 |
| 2005/0128286 A1 * | 6/2005 | Richards | | 348/36 |
| 2005/0140685 A1 * | 6/2005 | Garg | | 345/543 |
| 2005/0246487 A1 * | 11/2005 | Ergan et al. | | 711/113 |
| 2006/0080682 A1 * | 4/2006 | Anwar et al. | | 719/331 |
| 2006/0184803 A1 * | 8/2006 | Ulrich et al. | | 713/189 |
| 2007/0200855 A1 * | 8/2007 | Minagawa | | 345/474 |
| 2007/0207854 A1 * | 9/2007 | Wolf et al. | | 463/29 |
| 2007/0218992 A1 * | 9/2007 | Maehiro et al. | | 463/31 |
| 2007/0288661 A1 * | 12/2007 | Guillemot et al. | | 709/247 |
| 2008/0036493 A1 * | 2/2008 | Kelem et al. | | 326/38 |
| 2009/0015679 A1 * | 1/2009 | Hayakawa et al. | | 348/207.1 |
| 2009/0158279 A1 * | 6/2009 | Iino et al. | | 718/100 |

OTHER PUBLICATIONS

Gottry, Ken. "Pick up performance with generational garbage collection." Home page:< http://www. javaworld.com/javaworld/jw-03-2003/jw-0307-j2segc_p. html>. Extraído em: Julho (2002).*

(Continued)

*Primary Examiner* — Gurkanwaljit Singh
(74) *Attorney, Agent, or Firm* — Kilpatrick Townsend & Stockton LLP (57) ABSTRACT

Among other disclosed subject matter, a computer program product is tangibly embodied in a computer-readable storage medium and includes instructions that when executed by a processor perform a method for allocating assets. The method includes assigning each of multiple operation sectors defined by a software program to respective ones of multiple load groups, each load group grouping at least one operation sector for loading assets of the operation sector into memory. The method includes assigning all assets from the multiple operation sectors into respective ones of multiple clusters based on associations between the respective assets and the multiple operation sectors. The method includes generating and storing a memory layout that assigns one of multiple memory locations to each of the multiple clusters for at least one of the multiple load groups.

28 Claims, 9 Drawing Sheets
(3 of 9 Drawing Sheet(s) Filed in Color)

(56) References Cited

OTHER PUBLICATIONS

Appel, Andrew W. "Simple Generational Garbage Collection and Fast Allocation." (1988).*

Moore, J.R.; Travis, A. R L; Lang, S. R.; Castle, O. M., "The implementation of a multi-view autostereoscopic display," Stereoscopic Television, IEE Colloquium on , vol., no., pp. 4/1,416, Oct. 15, 1992.*

"Dynamic memory allocation" Wikipedia, 2007 [Online] [Retrieved on Jul. 2, 2009] Retrieved from the Internet: http://web.archive.org/web/20071225130825/http://en.wikipedia.org/wiki/Memory_allocation.

"Memory management" Wikipedia, 2007 [Online] [Retrieved on Jul. 2, 2009] Retrieved from the Internet: http://web.archive.org/web/20071020071456/http://en.wikipedia.org/wiki/Memory_management.

"Memory-mapped I/O" Wikipedia, 2006 [Online] [Retrieved on Jul. 2, 2009] Retrieved from the Internet: http://web.archive.org/web/20060205031356/http://en.wikipedia.org/wiki/Memory_map.

* cited by examiner

ALLOCATING AND MANAGING SOFTWARE ASSETS

TECHNICAL FIELD

This document relates to information processing.

BACKGROUND

Existing technology in allocating and managing assets for a software program includes an approach where fixed-size memory blocks are assigned (sometimes called "spatial asset buckets") and another approach where memory location is determined at runtime (sometimes called "dynamic asset allocation"). In spatial asset buckets, the bucket size sets an upper limit for the amount of assets that can be used in a sector, which can cause designers to create less rich environments and can lead to inefficient memory use. For example, an asset-poor hallway is allocated the same size bucket as an asset-heavy library. In dynamic asset allocation, the decision of which assets to load has to be made during runtime, which can lead to delay noticeable to the player. Also, fragmentation of the memory space can occur.

SUMMARY

The invention relates to allocating and managing assets.

In a first aspect, a computer program product is tangibly embodied in a computer-readable storage medium and includes instructions that when executed by a processor perform a method for allocating assets. The method includes assigning each of multiple operation sectors defined by a software program to respective ones of multiple load groups, each load group grouping at least one operation sector for loading assets of the operation sector into memory. The method includes assigning all assets from the multiple operation sectors into respective ones of multiple clusters based on associations between the respective assets and the multiple operation sectors. The method includes generating and storing a memory layout that assigns one of multiple memory locations to each of the multiple clusters for at least one of the multiple load groups.

Implementations can include any or all of the following features. The method can further include receiving an initial map of the multiple operation sectors, the map configured to be traversed, in execution of the software program, from a start sector through any of multiple paths to an end sector; and generating an essentially linear map that includes each of the multiple operation sectors, the essentially linear map generated using the initial map, wherein the essentially linear map is used in assigning the multiple operation sectors to the multiple load groups. The initial map can be configured so that the start and end sectors can be reassigned among the multiple operation sectors. Generating the essentially linear map can include performing graph analysis on the initial map. The essentially linear map can be generated so that the number of the multiple load groups corresponds to a minimum number of the operation sectors that must be traversed in proceeding from the start sector to the end sector. The method can further include generating a bit field for each of the multiple assets, the bit field indicating, for each of the load groups, whether the asset is associated with that load group. Assigning the assets to the clusters can include ensuring that each cluster contains only assets having identical bit fields. The method can further include assigning a priority value to each cluster for each of the load groups, the priority value determined based at least on relationships between the operation sectors and the assets used therein; wherein the priority values are used in generating the memory layout. The method can further include assigning a detail status to each of the clusters, the detail status indicating the cluster as being one of detail information and non-detail information; wherein the detail status is used in generating the memory layout. The method can further include selecting at least one of the load groups for each of the clusters, the load group selected using the priority values of the clusters associated with the load group; and assigning an address of one of the memory locations to the cluster for the selected load group. The memory layout can be generated so that: for each of the load groups, the memory layout lists all of the clusters in that load group and adjacent load groups; the memory layout minimizes an amount of data movement in progressing from one of the load groups to a next one of the load groups; and the memory layout contains as many of the clusters from the other load groups as possible. The method can further include providing feedback to a designer of the software program using the memory layout. The feedback can include a cluster placement map visually illustrating how the multiple clusters are placed in the memory for each of the multiple load groups. The feedback can include a priority map visually illustrating priority values for each of the multiple clusters for the multiple load groups. The feedback can include a disk activity map visually illustrating, for each of the multiple load groups, which clusters are involved in disk activity. The feedback can include a load group overflow map visually illustrating whether any of the multiple load groups exceeds an allotted memory space. The feedback can include a visibility range map visually illustrating, for each of the multiple load groups, how many load groups in each direction from the load group can be fit into the memory. The method can further include packing all contents of the software program into a runtime file on a disk for use in executing the software program, the contents packed using the memory layout. At least two assets that according to the memory layout are to be read sequentially into the memory can be co-located on the disk based on the memory layout. The software program can include an application configured to load and unload the multiple assets at stages of execution. The application can include a game, the operation sectors can include spatial sectors to be traversed by a game character, and the assets can include features visible in the game. The application can include an installation program.

In a second aspect, a computer program product is tangibly embodied in a computer-readable storage medium and includes instructions that when executed by a processor perform a method for managing assets. The method includes identifying one of multiple operation sectors of a software program currently active during execution of the software program, the operation sector associated with a load group. The method includes accessing a memory layout based on the load group of the identified operation sector. The method includes loading at least a portion of assets corresponding to the load group into a memory location specified by the memory layout.

In a third aspect, a system includes a processor, an output device controlled by the processor to present at least visual output, and a storage device accessible to the processor. The storage device includes a software program including instructions for generating the visual output, the software program comprising assets associated in multiple clusters; and a memory layout that assigns one of multiple memory locations to each of the multiple clusters for at least one of multiple load groups.

The system can be implemented in a gaming system, wherein the software program includes a game, and the assets include features visible in the game.

Implementations can provide any or all of the following advantages. Asset allocation and management can be improved. A game designer can be provided useful feedback regarding memory-related game behavior before the game is finalized. Software can be made to run more efficiently using a memory layout that plans the loading/unloading of assets. Packing of software assets can be optimized based on a memory layout.

The details of one or more embodiments are set forth in the accompanying drawings and the description below. Other features and advantages will be apparent from the description and drawings, and from the claims.

DESCRIPTION OF DRAWINGS

The patent or application file contains at least one drawing executed in color. Copies of this patent or patent application publication with color drawing(s) will be provided by the Office upon request and payment of the necessary fee.

Like reference symbols in the various drawings indicate like elements.

DETAILED DESCRIPTION

Figure 1:
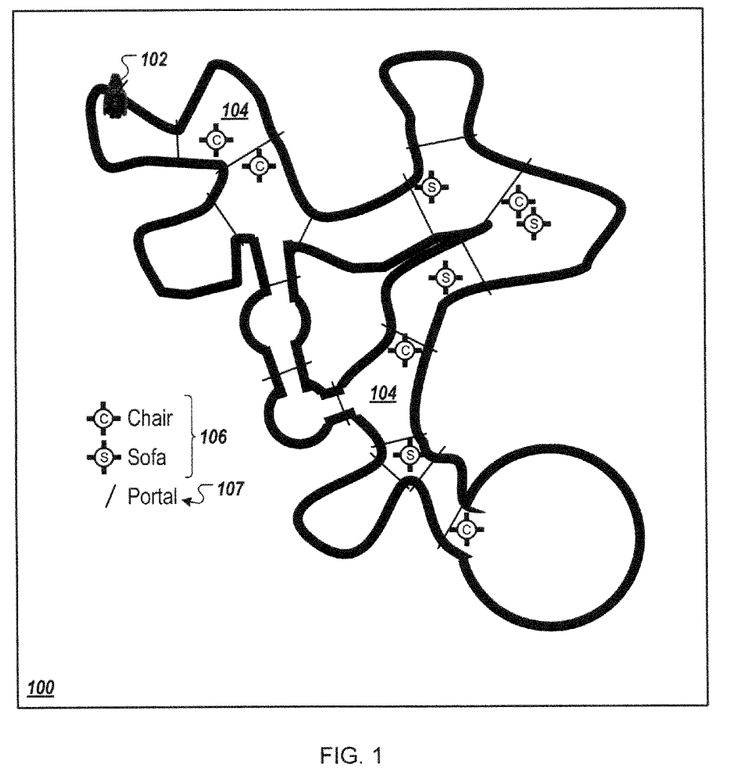
FIG. 1 shows an example map of a game environment.

FIG. 1 shows an example map 100 of a game environment. The map can, for example, be the basis for a computer game where the player navigates a character 102 through various numbers of spatial sectors 104, which can correspond to "rooms", from a start sector to an end sector, here labeled "Thunderdome". In some implementations, the map 100 can be used in allocating and managing one or more assets 106 that occur in the game. For illustration purposes, the shown assets include a Chair and a Sofa. Portals 107 are also included.

A game designer can create the map 100 using a computer-based design program. In so doing, the designer can define or otherwise specify which assets to use and where the respective assets come into play. For example, the Chair asset and the Sofa asset here occur in some of the sectors 104, and the Portal 107 separates adjacent sectors from each other. For example, the portals can be used to control loading of assets into memory, as the collective size of all assets may be too big to fit in memory at once. Assets can be movable within the map 100, for example by user control. Examples below will describe how the design of the map 100 can benefit from feedback regarding memory performance, and how the allocation and management of assets can be enhanced using a memory layout.

Figure 2:
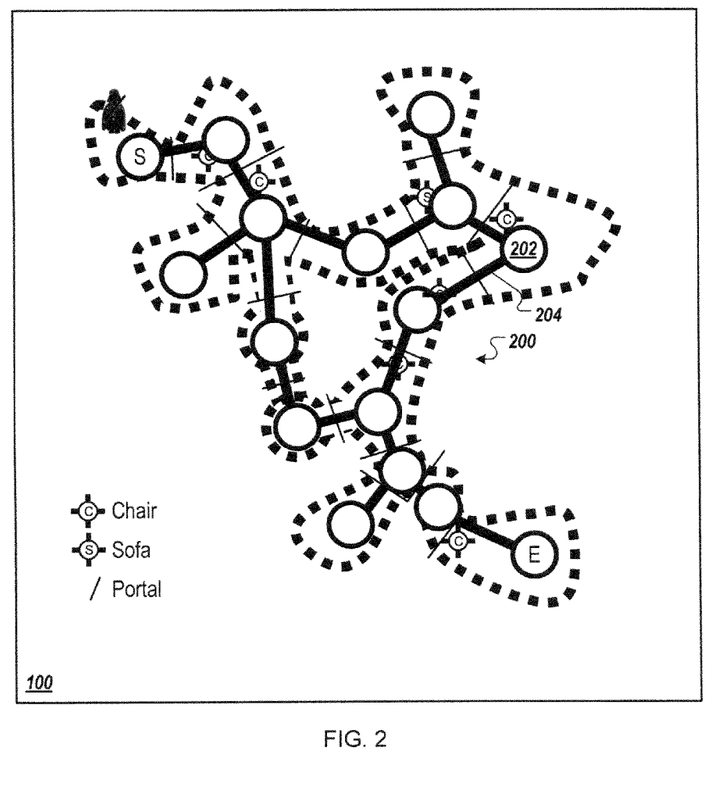
FIG. 2 shows an example linear path based on the map in FIG. 1.

FIG. 2 shows an example path 200 based on the map 100 in FIG. 1. In some implementations, sectors 104 of the map 100 can be identified and linked according to the pathways created by the game designer. The map can include any number of nodes 202, each connected to one or more links 204. A start node is labeled "S" and an end node is here labeled "E". In some implementations, the creation of the path 200 can be done flexibly so that the user has the opportunity to define the start and/or end nodes arbitrarily within the map 100.

Figure 3:
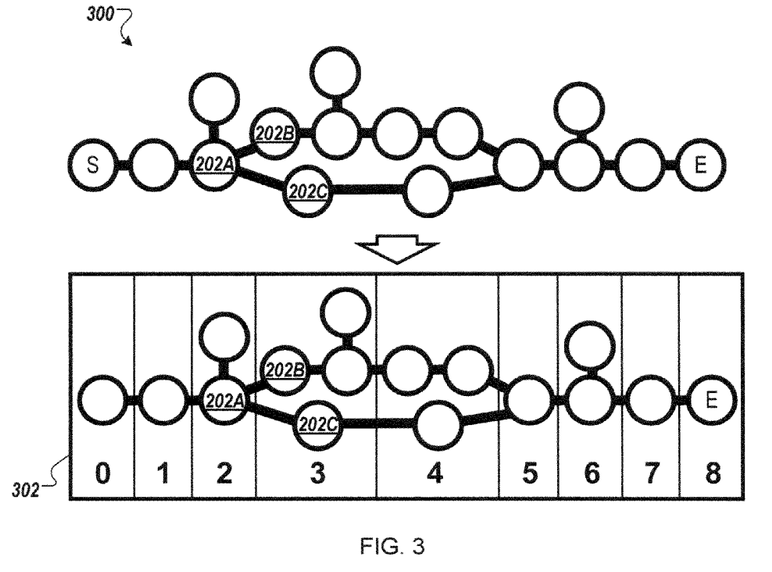
FIG. 3 schematically shows example flattening of the linear path and assignment of load groups.

The path 200 can be "flattened" to facilitate optimization of the loading/unloading of assets regarding the various nodes. FIG. 3 schematically shows example flattening 300 of the path 200 and assignment of load groups 302. First, the path 200 can be arranged in essentially a linear fashion, reaching from the start node on the left side, in this example, to the end node on the right side. This can illustrate one or more alternative ways to traverse the path. Here, for example, after a node 202A the path divides into an upper pathway beginning with a node 202B, and a lower pathway beginning with a node 202C. Accordingly, either of the upper and lower pathways can be taken in proceeding through the map.

In some implementations, graph analysis can be performed on the path 200 to decide how to allocate the nodes 202 among the load groups 302. The load groups can be chosen to facilitate good loading and unloading of assets during game play. This can include determining a shortest path from start to finish. For example, the lower pathway beginning with the node 202C can be identified as involving fewer nodes (a total of at least nine nodes) than the upper pathway (which here involves at least eleven nodes). It is noted that some of the nodes 202 may not be traversed as the player passes from start to end. For example, a particular node may not lead to any other nodes, but rather requires the player to return again to a previous node. However, in the path 200 a minimum of nine nodes must be passed in moving from start to end.

Each of the load groups 302 is assigned at least one of the nodes 202. For example, the start node is here assigned to a load group 302-0, the node 202A and another node are assigned to a load group 302-2, and four nodes including the nodes 202B and 202C are assigned to a load group 302-3. Nodes belonging to different pathways can be assigned to the same load group, as is done with the nodes 202B and 202C, for example. The nodes 202 are assigned to the load groups 302 so that each of the load groups must be passed when the path 200 is traversed. For example, in the illustrated map the character must pass each of load groups 302-0 through 302-8 in traveling from the start node to the end node. If a game level has more than one major path, load group assignment can be repeated for each start/end pair.

The following is an example algorithm for determining linear load groups, given a start and end node in a connected graph. Suitable variations can be made to handle different cases.

Given connected nodes NN, where one node S has been labeled as the start and one node E has been labeled as the End, Define a traversal distance as the minimum number of node traversals required to travel from one node to another.

1. Determine the path SP from S to E which traverses the smallest number of nodes. If there is more than one such path, choose one of them arbitrarily.
2. For every node N traversed by SP in Step 1, add N to the set of "short-path" nodes SPN. In FIG. 3, the SPN follows the bottom of the diagram, including the node 202C.
3. Each node in SPN is assigned a load group number equal to its traversal distance from S. In FIG. 3, S is assigned to group 0, E is in group 8, and the other SPN nodes are in groups equal to their distance from S.

4. For every node N not in SPN . . . .
   a. Traverse the graph to find the two closest SPN nodes, Sa and Sb, which have been assigned (in step 3 above) to load groups LGa and LGb. Measure the traversal distance to Sa and Sb, giving integral values TDa and TDb.
   b. Assign N to the load group equal to LGa+((LGb−LGa)*(TDa/(TDb+TDa))), rounded to the nearest integer. For example, if the two closest nodes to N are:
      LGa in group 3 (2 steps away)
      LGb in group 6 (4 steps away)
        . . . then it would be assigned to the group produced by the equation:

$$\mathrm{round}(3+((6-3)*(2/(2+4))))=4$$

. . . so it gets placed in group 4.

Figure 4:
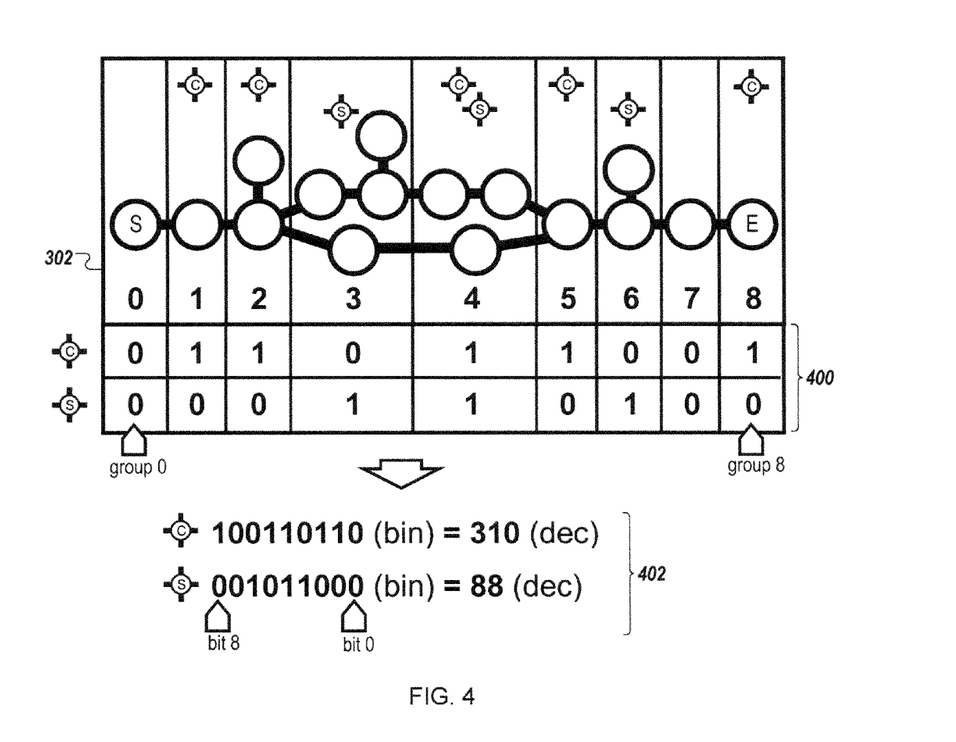
FIG. 4 shows example assignment of bit fields for assets.

Assets can occur in one or more spatial sectors, and therefore can be required in one or more load groups to which the corresponding nodes are assigned. FIG. 4 shows example assignment of bit fields 400 for assets. For example, the Chair asset is here defined as occurring in, or being possible to bring into, the spatial sectors assigned to load groups 302-1, 302-2, 302-4, 302-5 and 302-8. Accordingly, the Chair asset can be assigned a "1" bit for each of these load groups and a "0" bit for the remaining load groups, as indicated in the bit field 400. Similarly, the Sofa asset is here defined as occurring in (or transportable to) load groups 302-3, 302-4 and 302-6. The Sofa asset can therefore be assigned "1" bits for these load groups and zeroes for the other load groups. In some implementations, thousands of separate assets can be used, and each one can be assigned a corresponding bit field 400.

The bit fields can be used in generating binary numbers 402. Regarding the Chair asset, for example, the bit field 011011001 can be turned into the binary number 100110110. Similarly, for the Sofa asset, the bit field 000110100 can be turned into the binary number 001011000. In some implementations, the binary numbers can be converted to decimal numbers.

Figure 5:
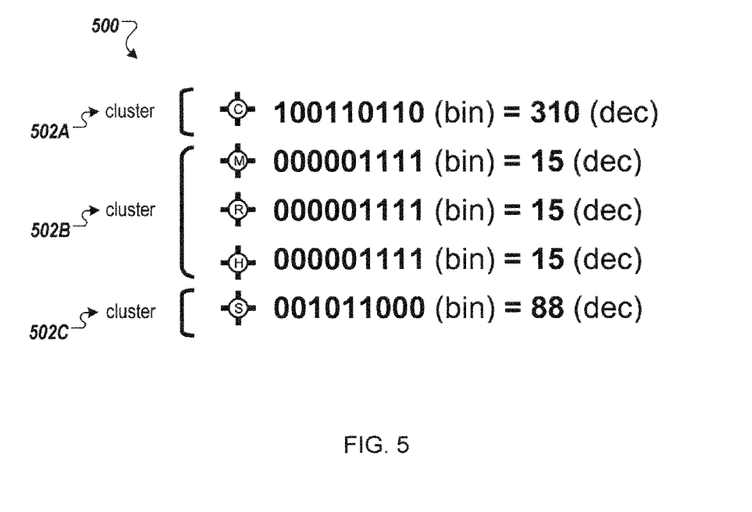
FIG. 5 shows example clustering of assets.

Assets having identical load group assignments can be clustered. FIG. 5 shows example clustering 500 of assets. Here, for example, the Chair asset with binary number 100110110 is the only asset associated with that binary number, and is therefore the only asset included in a first cluster 502A. Three other assets, labeled M, R and H, respectively, all have the same binary number 0000011111 and have therefore been clustered in a second cluster 502B. For example, the assets can correspond to M=Motorcycle, R=Rider and H=Helmet assets, respectively, which appear in the game together although they are separate assets. The Sofa asset, finally, is the only asset with the binary number 001011000 and is therefore the only asset included in a third cluster 502C.

Clusters can significantly reduce the number of items to be read from disk to memory during play. For example, reading one large contiguous cluster from the disk can be done faster than reading individual assets. For example, in one implementation, 5600 individual assets were grouped into about 250 clusters.

In some implementations, an individual cluster can be broken into "detail" assets and "non-detail" assets. For example, a "detail" asset can satisfy the definition    Detail assets (and clusters): Assets which cannot easily be seen from far away, such as sand texture, pencils, detailed engraving, or very small animals such as hamsters.

As another example, a "non-detailed" asset can satisfy the definition

Non-detail assets (and clusters): Everything else, such as doors, windows, chairs, mountains, troops of invading aliens, Volkswagens, or large animals such as cows.

For example, separating the detail assets from non-detail assets can be advantageous in avoiding the loading of the complex assets before they are actually needed.

Priority scores can be assigned per cluster and per load group. For example, when the character is standing inside a spatial sector assigned to a particular load group, that load group's assets must be loaded into memory. But it can also be important to have loaded assets from nearby load groups as well, or else a visual "pop in" of assets can occur as the character travels through the level.

As a particular example, assume that the character is standing in load group 302-4. The assets of load group 302-4 should then be loaded. In addition load groups 302-3 and 302-5 should be fully loaded as well, because the player can see these areas from where the character is standing. If there is additional room in the memory, load groups 302-2 and 302-6 can be loaded as well. Because these correspond to areas that are further away, some of the small details of these load groups can be left out.

In some implementations, priority scores can range from zero (a highest priority) to higher numbers (for lower priority). The following pseudo code illustrates an example of assigning priority scores:

for each load group G
      for each cluster C
         let the distance D(G,C) be the minimum number of load groups between G and any load group which contains C.
         if C is a detail cluster and D(G,C)>1 then let the score S(G,C) equal 9.
         else let the score S(G,C) equal D(G,C).

The following are examples of priority score assignments. Suppose that load groups 0-14 have been defined and that a non-detail cluster C is assigned to the groups numbered 1, 2, 8 and 9. The score S(G,C) for the non-detail cluster C could be as follows:

| Group | 0 | 1 | 2 | 3 | 4 | 5 | 6 | 7 |
|---|---|---|---|---|---|---|---|---|
| Score | 1 | 0 | 0 | 1 | 2 | 3 | 2 | 1 |
| Group | 8 | 9 | 10 | 11 | 12 | 13 | 14 | |
| Score | 0 | 0 | 1 | 2 | 3 | 4 | 5 | |

The cluster C here has a score of zero in load groups 1, 2, 8 and 9, indicating that the cluster is critically important in these areas. Areas father away from these load groups, in contrast, can be assigned higher numbers, corresponding to lower priorities.

Assume now that the cluster C instead is a detail cluster, and assigned to the groups numbered 1, 2, 8 and 9. The score S(G,C) for the detail cluster C could be as follows:

| Group | 0 | 1 | 2 | 3 | 4 | 5 | 6 | 7 |
|---|---|---|---|---|---|---|---|---|
| Score | 1 | 0 | 0 | 1 | 9 | 9 | 9 | 1 |
| Group | 8 | 9 | 10 | 11 | 12 | 13 | 14 | |
| Score | 0 | 0 | 1 | 9 | 9 | 9 | 9 | |

As in the previous example, the detail cluster C here has a score of zero in load groups 1, 2, 8 and 9. In load groups 4-6 and 11-14, on the other hand, the priority score is nine, indicating that the cluster is a very low priority in those load groups.

Accordingly, a table or other collection of priority values or scores can be generated for each cluster regarding the various load groups.

A memory layout can be generated that assigns one of the available memory locations to each cluster for at least one of the load groups. In some implementations, the memory layout can be generated using a packing algorithm. For example, the following describes an example packing algorithm:

The goal of generating a memory layout can be to assign a memory address RAM(G,C) per cluster per load group. This address may be NULL, which indicates that there is not sufficient room in memory for that cluster in that load group.

Determining these addresses is an exhaustive process of computation. In some implementations, there are too many possible solutions to explore in a practical time, so heuristics and tuning values can be used to narrow the search down to a few hundred thousand options. Each of these can be searched and analyzed, and each can be given a score. The best score wins.

For example, let the critical limit be a tuning value, set to 1.
Define Boolean flags fCRITICAL, fALLGROUPS, fPLACED per cluster per load group, and set all flags initially to false.
Define Boolean flags fFINISHED per group, and set to false.
Define Boolean flags fDETAIL per cluster, and set to true if the cluster is a detail cluster, false otherwise.
Define Boolean flags fSMALL per cluster, and set to false.
Define the usage count UC(C) of each cluster be an integer, and set it to zero.
Define the total RAM size for assets TRAM to be the available memory bytes (for example, the value in Force Unleashed was 146,800,640.
Define for each group G the address markers LOMEM(G), and HIMEM(G)
Define an address A(G,C) per group per cluster, initially set to NULL
Define the size SIZE(C) fo each cluster to be the number of bytes the cluster occupies in memory.
Define SCORE as an integer.
Define BESTSCORE as an integer, initialized to −1.
Define BESTSCOREDATA as a variable capable of holding one copy of each A(G,C).
Define the sub-procedure PLACE_CLUSTER(group G, cluster C) as:
1. Align with previous:
If A(G−1,C) is not NULL, and if its placement does not overlap any cluster already placed in GWG, then set A(G,C) to A(G−1,C).
2 . . . or align with next:
Else if A(GWG+1,CC) is not NULL, and if its placement does not overlap any cluster already placed in GWG, then set A(G,C) to A(G+1,C).
3 . . . or pack normally:
Else if there is at least one free space of size SIZE(C) or larger, then
  a. If fSMALL(C) then Set A(G,C) to the closest free space to LOMEM(G) of size SIZE(C) or larger.
  b. Else, Set A(G,C) to the closest free space to HIMEM(G) of size SIZE(C) or larger.
4 . . . or reject it:
Else
  a. Set A(G,C) to NULL 5. Mark as placed:
Set fPLACED(G,C) to true.
Define the sub-procedure PLACE_CRITICAL_CLUSTERS(DET) as:
1. Measure critical space per group:
For each load group G:
  a. Set the group's total critical size TCS(G) to zero.
  b. For each cluster C:
    i. If the score SCORE(G,C) assigned in Step 4 is less than or equal to the critical limit, then:
      1. C is considered critical for G, and fCRITICAL(G,C) is set to true.
      2. Add 1 to UC(C)
      3. The SIZE(C) is added to TCS(G).
2. Clear group flags:
For all groups G:
  c. Set LOMEM(G) to zero, and HIMEM(G) to TRAM
  d. Set fFINISHED(G) to false
3. Clear cluster flags:
For all clusters C:
  e. Set fPLACED(C) to false
  f. If the SIZE(C) is less than the average sizes of all clusters where fALLGROUPS is false, set (SMALL to true
4. Place the ALLGROUPS clusters:
For all clusters with fALLGROUPS true:
  g. For all groups G:
    i. If fSMALL(C) then Set A(G,C) to HIMEM(G), and subtract SIZE(C) from HIMEM(G)
    ii. Else, Set A(G,C) to HIMEM(G) to LOMEM(G) and add SIZE(C) to LOMEM(G)
5. Choose CWG:
If fFINISHED is true for all groups, then exit from this procedure. Else. from the load groups in which fFINISHED is false, choose the current working group CWG to be the group with the largest value of TCS. This is the group with the least flexibility (least extra space), so we pack it first.
6. Choose CC:
Find the largest cluster C for which fCRITICAL(CWG,C) is true, and fPLACED(CWG,C) is false, and fDETAIL(C) is equal to DET. This is CC. If there is no such cluster, goto Choose CWG.
7. Place critical cluster:
PLACE_CLUSTER(CWG,CC)
8. Expand into other groups:
For each group G, if fCRITICAL(G,CC) and not fPLACED(G,CC)
  h. Set A(G,CC) to A(CWG,CC) and set fPLACED(G,CC) to true
9. Loop again:
Goto Choose CC.
10. Loop again:
Goto Choose CWG.
Define the sub-procedure PLACE_NONCRITICAL_CLUSTERSO as:
1. Choose CWG:
If fFINISHED is true for all groups, then exit from this procedure. Else. from the load groups in which fFINISHED is false, choose the current working group CWG to be the group with the smallest amount of available space. This is the group with the least flexibility (least extra space), so we pack it first.
2. Choose CC:
Find the largest cluster C for which SCORE(CWG,C) is the lowest available value, and fPLACED(CWG,C) is false. This is CC. If there is no such cluster, goto Choose CWG.

3. Place critical cluster:
PLACE_CLUSTER(CWG,CC)
4. Expand into other groups:
For each group G, if fCRITICAL(G,CC) and not fPLACED(G,CC)
   a. Set A(G,CC) to A(CWG,CC) and set fPLACED(G, CC) to true
5. Loop again:
Goto Choose CC.
6. Loop again:
Goto Choose CWG:
Define the sub-procedure FINISH_ITERATION( ) as:
1. Set ALLGROUPS flags:
For all clusters C:
   a. If A(G,C) is not NULL for any group G, then Set fALLGROUPS(C) to true.
2. Calculate Score:
Set SCORE to zero
   a. For all groups G:
      i. For all clusters C:
         1. If A(G, C) is not NULL and A(G, C) is not equal to A(G+1, C), then add SIZE(C) to SCORE.
   b. If SCORE is less than BESTSCORE or BESTSCORE is −1, then save all addresses A( ) into BESTSCORE-DATA Then the main procedure is:
1. PLACE_CRITICAL_ASSETS(false)
2. PLACE_CRITICAL_ASSETS(true)
3. PLACE_NONCRITfCAL_ASSETS( )
4. FINISH_ITERATION( )
5. If no fALLGROUPS flags were set, exit and return BESTSCOREDATA as the final address data. Otherwise, goto 1.

The main procedure itself may involve hundreds of passes of asset placement, and in practice, this procedure is called many times using different configurations of tuning values, such as the critical limit.

The only restriction on the number of solutions which may be searched is the available time (if the game creator is willing to wait longer, a better solution may be found).

Side note: quantum computers, or faster conventional computers, when available, may drastically reduce the search time, or increase the number of solutions which may be searched.

The procedure may be modified to account for new cluster size footprints.

Based on the packing algorithm, memory addresses can be assigned to clusters.

For example, the assignment may be represented as

| Group   | 0 | 1 | 2 | 3 | 4 | 5 | 6 | 7 |
|---------|---|---|---|---|---|---|---|---|
| Score   | 1 | 0 | 0 | 1 | 2 | 3 | 2 | 1 |
| Address | • | • | • | • | • |   | • |   |

| Group   | 8 | 9 | 10 | 11 | 12 | 13 | 14 |
|---------|---|---|----|----|----|----|----|
| Score   | 0 | 0 | 1  | 2  | 3  | 4  | 5  |
| Address | • | • | •  | •  |    |    |    |

In the table above, a bullet (•) indicates that a memory address is assigned for the cluster regarding that load group, in this example. If no bullet is shown, a NULL address may be assigned and the cluster will not be loaded into memory together with that load group. A relatively high priority value does not always guarantee that an address will be assigned. For example, the score of two in the above table results in a memory allocation for some load groups but not for another. This can depend, for example, on the number and size of clusters having a higher priority, as well as the result of the packing algorithm.

Accordingly, a table for each cluster can be created that indicates the assigned memory location for each load group. As another example, a table for each load group can be generated, that indicates the memory addresses for each cluster. In some implementations, the memory layout can include a table of memory addresses (one per cluster per load group) that defines how assets are loaded and unloaded during play.

Memory layout information can be used in generating feedback, for example to a game designer. This can reveal important aspects of memory availability, such as whether there is likely to be user-noticeable delay. Feedback can be generated by presenting layout information visually in a user interface. For example, FIGS. 6A-E show example screens that can provide feedback regarding asset allocation.

Figure 6A:
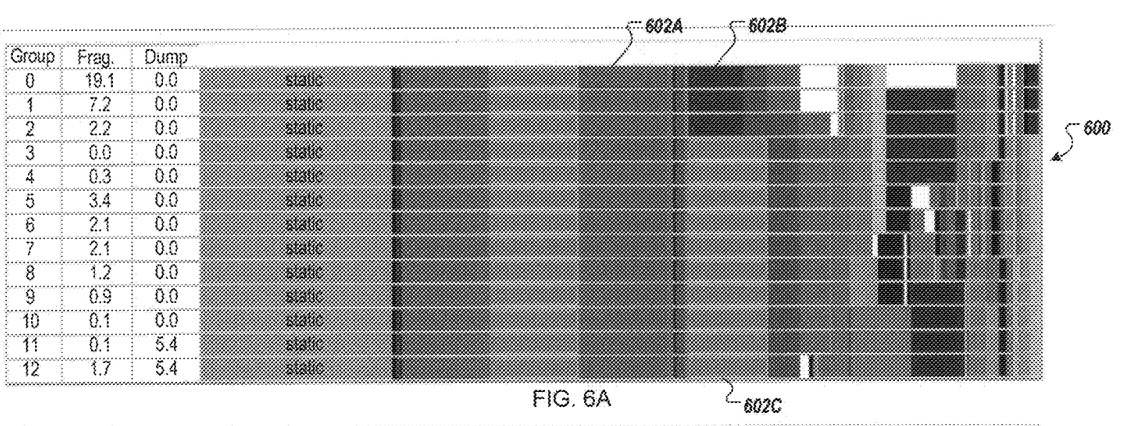
FIGS. 6A-E show example screens that can provide feedback regarding asset allocation.

Beginning with FIG. 6A, a cluster placement map 600 is organized according to load group number (ranging from 0-12), as indicated in the leftmost column. The cluster placement map 600 can be generated using the memory layout created for a particular set of clusters and load groups. Each row in the map 600 corresponds to a state of the memory when the corresponding load group has been loaded. The colors are here assigned arbitrarily to distinguish memory locations from each other. As the character moves through the spatial sectors from start to end, the clusters in memory will adjust to match the respective row of the corresponding load group. For example, a first cluster 602A is seen to occupy the same memory location in all load groups. In contrast, a second cluster 602B appears in a particular memory location in the first three load groups only, and is thereafter overwritten by a third cluster 602C. Accordingly, the cluster placement map 600 can be generated to a game designer to give a visual indication of how memory space will be allocated during the respective load groups.

Figure 6B:
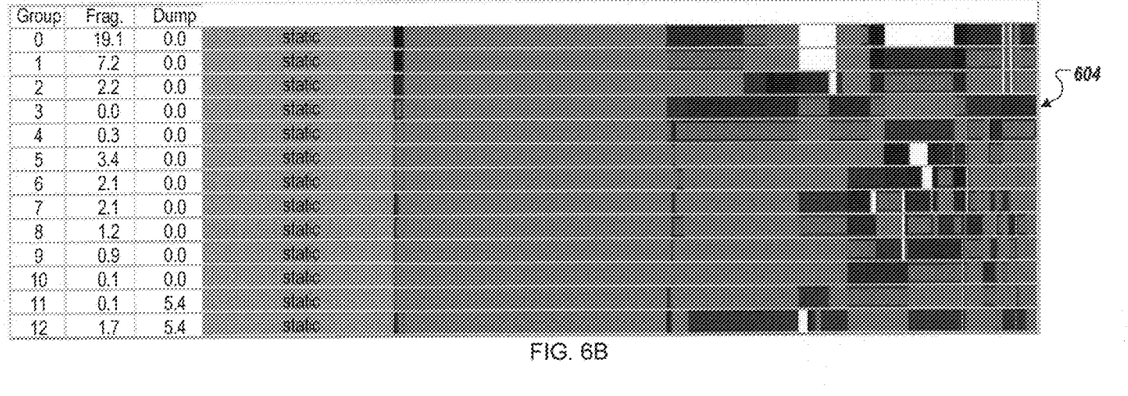

FIG. 6B shows a priority map 604 generated from the same memory layout as the map 600. Moreover, the map 604 is also organized according to the load group numbers ranging from 0-12. Here, the priority score or value for each cluster is indicated by the brightness of the shading. For example, a bright red area can indicate a highest priority (such as a priority score of zero), and less bright areas can indicate less priority. Accordingly, rows with a large amount of bright red shading are critically impacted and may result in trouble loading data.

Figure 6C:
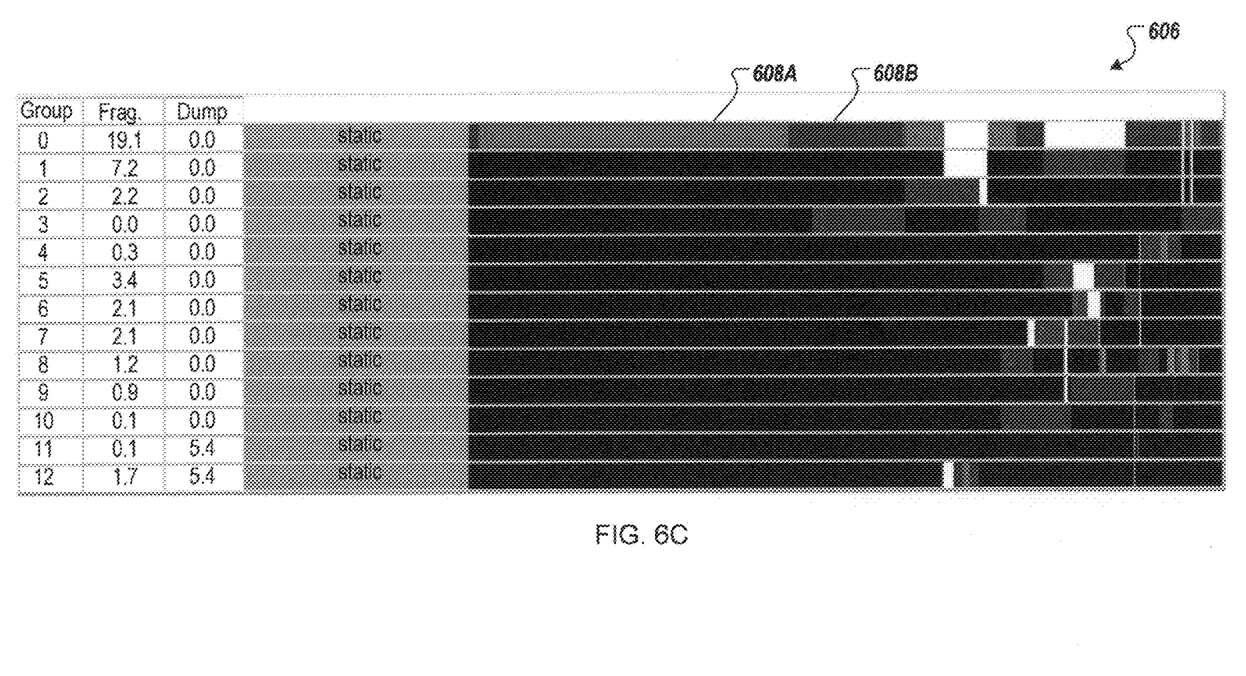

FIG. 6C shows a predicted disk activity map 606 generated from the same memory layout as the maps 600 and 604. Here, a bright blue shade, for example in cluster 608A, indicates that critical assets (e.g., those labeled bright red in the map 604) are being loaded into the memory, which can cause gameplay to pause. A dim blue shade, for example in cluster 608B, indicates that non-critical assets are being loaded. For example, non-critical assets can be loaded while the game is running. A green shade indicates that a cluster is being moved from one memory location to another according to the memory layout, which in some implementations can be done more quickly than loading from disk. A black shade indicates that there is no data movement or disk activity regarding a memory location.

The following is an example interpretation of the exemplary data shown in the map 606. Ideally, most of the chart should be black. The present example is relatively well optimized, so that after the first load group, most of the disk activity involves non-critical (i.e., dim-blue shaded) clusters. Accordingly, the game creator can receive a clear sense of whether the disk-loading experience will be smooth and transparent to the user, or whether problems might occur. In some implementations, the maps 600-606 can be generated in a common screen, for example.

Figure 6D:
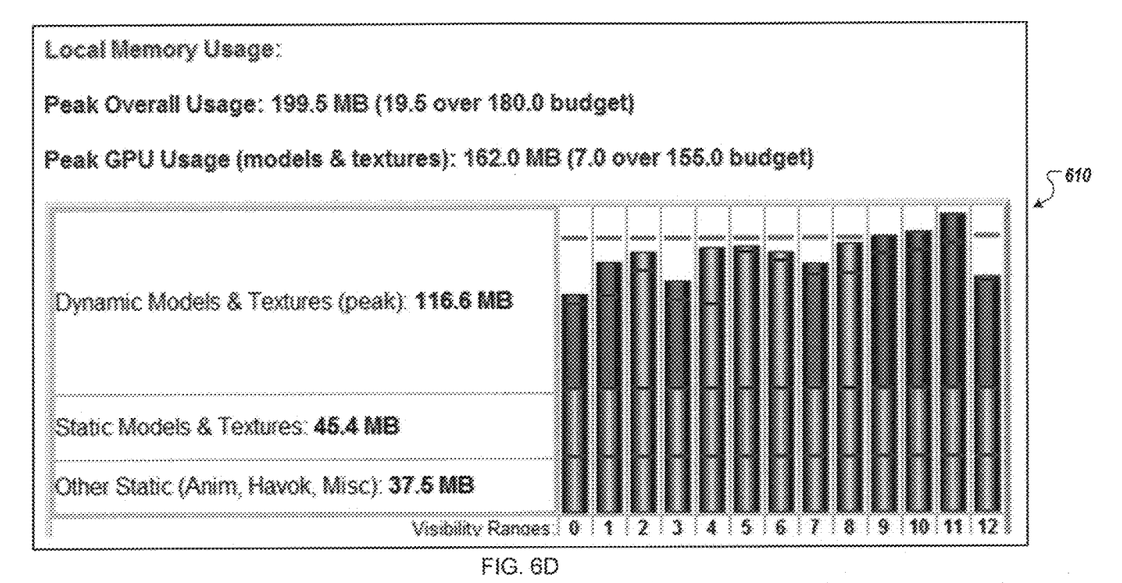

FIG. 6D shows a load group overflow map 610 generated from the same memory layout as the maps 600-606. Here, the load groups are indicated at the bottom of the map 610. For each load group, the map 610 indicates whether the asset-related memory use is below, at or above an allowed amount. For example, the two first load groups are predicted to stay below the allowed usage and are shaded in green. The third load groups and others shaded in yellow reach within a predefined margin of the maximum amount. Three load groups shaded in red, finally, exceed the allowed amount. The map 610 can also include information on predicted overall memory and GPU usage.

Figure 6E:
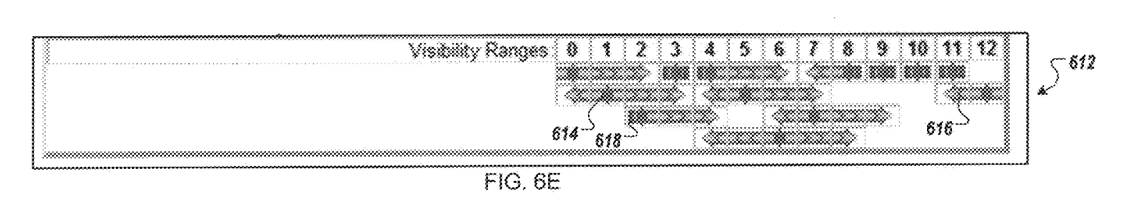

FIG. 6E shows a visibility map 612 generated from the same memory layout as the maps 600-606. Here, the load groups are indicated at the top of the map 610. In some implementations, the maps 610 and 612 can be combined, for example.

A dark blue marker 614 is assigned for each load group. An arrow 616 can be displayed next to the marker 614 to indicate how many load groups in each direction (e.g., forward or backward in the path of spatial sectors) can be fit into the memory. For example, for some load groups, the player can see multiple load groups "ahead" or "backward" in the game, while for others fewer load groups are visible. A red marker 618 can indicate a critical problem. In some implementations, the memory can be so full in the load group having the marker 618 that the adjacent area(s) cannot be loaded. For example, the player may notice "holes" in the world for assets that have not been loaded. In comparing the maps, the red markers 618 can be seen to correspond to the yellow warnings in the map 610 and also to the bright red rows of the map 604.

Accordingly, one or more of the maps 600-612 can be generated before the game is finished and used to provide feedback to a designer. The game can then be modified based on the feedback, for example to relocate assets from one spatial sector to another, or to modify an asset to require less memory.

Assets can include any kind of computer-based information to be loaded into memory (e.g., RAM), such as a 3D model or a texture map.

Other implementations than a computer game can be made. In some implementations, any kind of software project that needs to load and unload assets scheduled for use at particular times or in particular situations can benefit from the ideas described herein. For example, an installation program for a software solution/system can include a number of components to be sequentially loaded into memory during installation, such as depending on user selection of optional features. As another example, media content such as video and/or audio can be loaded according to a memory layout to improve performance and enhance the user's experience.

In some implementations, a memory layout can be used to guide how assets are packed onto a disk for delivery of the software program (e.g., the game). This can involve ordering the data to optimize the loading/unloading process. For example, two or more assets or clusters that are scheduled to be sequentially read into memory can be co-located on the disk.

Figure 7:
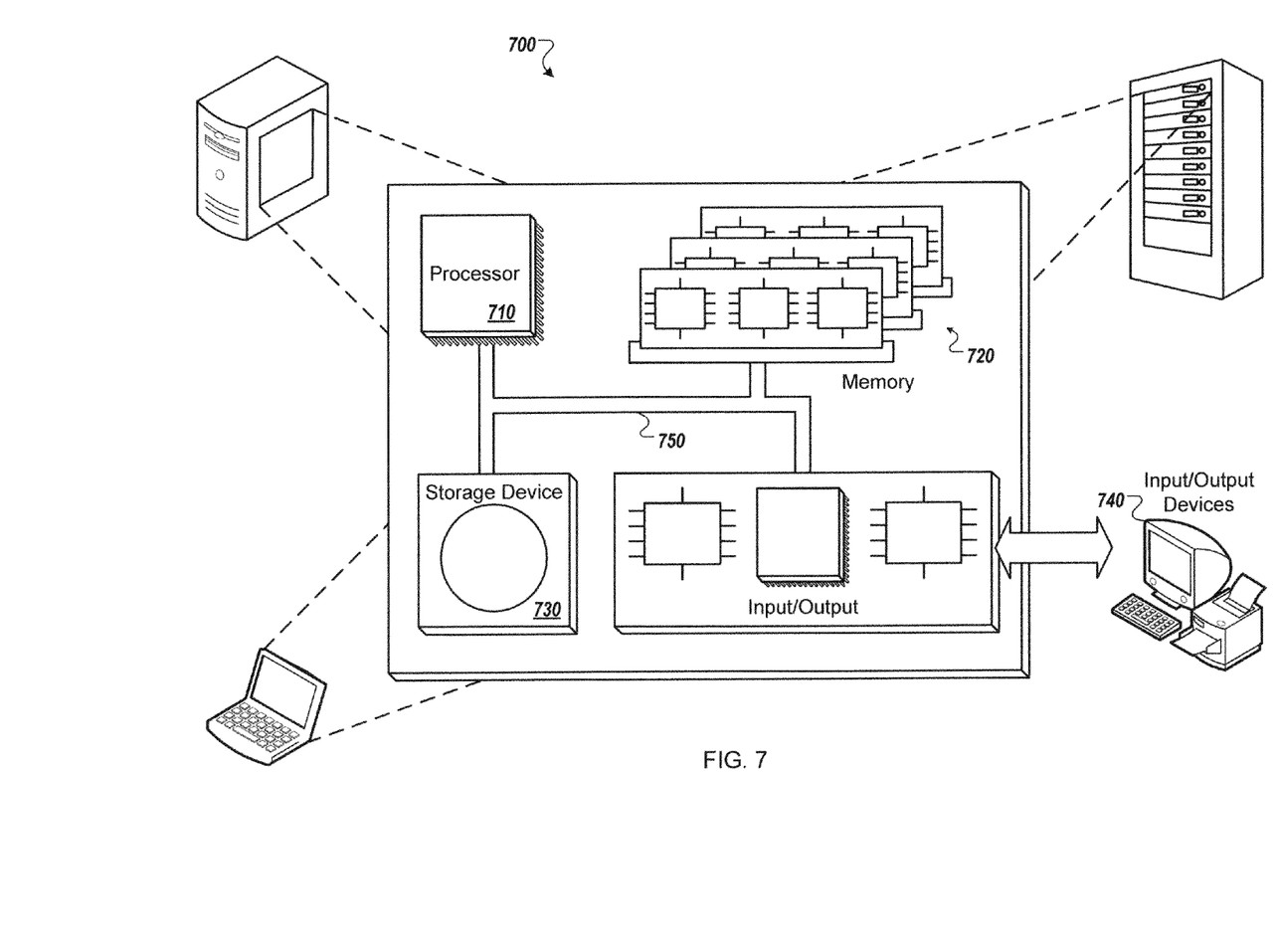
FIG. 7 is a block diagram of a computing system that can be used in connection with computer-implemented methods described in this document.

FIG. 7 is a schematic diagram of a generic computer system 700. The system 700 can be used for the operations described in association with any of the computer-implement methods described previously, according to one implementation. The system 700 includes a processor 710, a memory 720, a storage device 730, and an input/output device 740.

Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile, memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer program product tangibly embodied in a computer-readable storage medium and comprising instructions that when executed by a processor perform a method for allocating assets, the method comprising:
   performing, using a design program, analysis of software assets of a software program being designed to identify multiple operation sectors defined by the software program, the software program configured to generate a virtual environment comprising operation sectors that are traversable by a user of the software program;
   assigning each of the identified multiple operation sectors to respective ones of multiple load groups, each load group grouping at least one operation sector for loading assets of the operation sector into memory;
   assigning all assets from the multiple operation sectors into respective ones of multiple clusters based on associations between the respective assets and the multiple operation sectors;
   generating and storing a memory layout that assigns one of multiple memory locations to each of the multiple clusters for at least one of the multiple load groups; and
   providing, to a designer of the software program a user interface displaying memory-activity feedback about the software program using the memory layout, the memory-activity feedback provided without executing the software program.

2. The computer program product of claim 1, wherein the method further comprises:
   receiving an initial map of the multiple operation sectors, the map configured to be traversed, in execution of the software program, from a start sector through any of multiple paths to an end sector; and
   generating an essentially linear map that includes each of the multiple operation sectors, the essentially linear map generated using the initial map, wherein the essentially linear map is used in assigning the multiple operation sectors to the multiple load groups.

3. The computer program product of claim 2, wherein the initial map is configured so that the start and end sectors can be reassigned among the multiple operation sectors.

4. The computer program product of claim 2, wherein generating the essentially linear map comprises performing graph analysis on the initial map.

5. The computer program product of claim 4, wherein the essentially linear map is generated so that the number of the multiple load groups corresponds to a minimum number of the operation sectors that must be traversed in proceeding from the start sector to the end sector.

6. The computer program product of claim 1, wherein the method further comprises:
   generating a bit field for each of the multiple assets, the bit field indicating, for each of the load groups, whether the asset is associated with that load group, wherein assigning the assets to the clusters comprises ensuring that each cluster contains only assets having identical bit fields.

7. The computer program product of claim 1, wherein the method further comprises:
   assigning a priority value to each cluster for each of the load groups, the priority value determined based at least on relationships between the operation sectors and the assets used therein; and
   assigning a detail status to each of the clusters, the detail status indicating the cluster as being one of detail information and non-detail information;
   wherein the priority values are used in generating the memory layout; and
   wherein the detail status is used in generating the memory layout.

8. The computer program product of claim 7, wherein the method further comprises:
   selecting at least one of the load groups for each of the clusters, the load group selected using the priority values of the clusters associated with the load group; and
   assigning an address of one of the memory locations to the cluster for the selected load group.

9. The computer program product of claim 1, wherein the memory layout is generated so that:
   for each of the load groups, the memory layout lists all of the clusters in that load group and adjacent load groups;
   the memory layout minimizes an amount of data movement in progressing from one of the load groups to a next one of the load groups; and
   the memory layout contains as many of the clusters from the other load groups as possible.

10. The computer program product of claim 1, wherein the feedback comprises a cluster placement map visually illustrating how the multiple clusters are placed in the memory for each of the multiple load groups.

11. The computer program product of claim 1, wherein the feedback comprises a priority map visually illustrating priority values for each of the multiple clusters for the multiple load groups.

12. The computer program product of claim 1, wherein the feedback comprises a disk activity map visually illustrating, for each of the multiple load groups, which clusters are involved in disk activity.

13. The computer program product of claim 1, wherein the feedback comprises a load group overflow map visually illustrating whether any of the multiple load groups exceeds an allotted memory space.

14. The computer program product of claim 1, wherein the feedback comprises a visibility range map visually illustrating, for each of the multiple load groups, how many load groups in each direction from the load group can be fit into the memory.

15. The computer program product of claim 1, wherein the method further comprises:
packing all contents of the software program into a runtime file on a disk for use in executing the software program, the contents packed using the memory layout.

16. The computer program product of claim 15, wherein at least two assets that according to the memory layout are to be read sequentially into the memory are co-located on the disk based on the memory layout.

17. The computer program product of claim 1, wherein the software program includes an application configured to load and unload the multiple assets at stages of execution.

18. The computer program product of claim 17, wherein the application includes a game, the operation sectors include spatial sectors to be traversed by a game character, and the assets include features visible in the game.

19. The computer program product of claim 17, wherein the application includes an installation program.

20. A computer system comprising:
one or more processing devices;
a computer-readable media having instructions that, when executed by the one or more processing devices, cause the processing devices to perform a method for allocating assets, the method comprising:
performing, using a design program, analysis of software assets of a software program being designed to identify multiple operation sectors defined by the software program, the software program configured to generate a virtual environment comprising operation sectors that are traversable by a user of the software program;
assigning each of the identified multiple operation sectors to respective ones of multiple load groups, each load group grouping at least one operation sector for loading assets of the operation sector into memory;
assigning all assets from the multiple operation sectors into respective ones of multiple clusters based on associations between the respective assets and the multiple operation sectors;
generating and storing a memory layout that assigns one of multiple memory locations to each of the multiple clusters for at least one of the multiple load groups; and
providing, to a designer of the software program a user interface displaying memory-activity feedback about the software program using the memory layout, the memory-activity feedback provided without executing the software program.

21. The computer system of claim 20, wherein the method further comprises:
receiving an initial map of the multiple operation sectors, the map configured to be traversed, in execution of the software program, from a start sector through any of multiple paths to an end sector; and
generating an essentially linear map that includes each of the multiple operation sectors, the essentially linear map generated using the initial map, wherein the essentially linear map is used in assigning the multiple operation sectors to the multiple load groups.

22. The computer system of claim 20, wherein the method further comprises:
generating a bit field for each of the multiple assets, the bit field indicating, for each of the load groups, whether the asset is associated with that load group, wherein assigning the assets to the clusters comprises ensuring that each cluster contains only assets having identical bit fields.

23. The computer system of claim 20, wherein the method further comprises:
assigning a priority value to each cluster for each of the load groups, the priority value determined based at least on relationships between the operation sectors and the assets used therein; and
assigning a detail status to each of the clusters, the detail status indicating the cluster as being one of detail information and non-detail information;
wherein the priority values are used in generating the memory layout; and
wherein the detail status is used in generating the memory layout.

24. The computer system of claim 23, wherein the method further comprises:
selecting at least one of the load groups for each of the clusters, the load group selected using the priority values of the clusters associated with the load group; and
assigning an address of one of the memory locations to the cluster for the selected load group.

25. A method for allocating assets, the method comprising:
performing, using a design program, analysis of software assets of a software program being designed to identify multiple operation sectors defined by the software program, the software program configured to generate a virtual environment comprising operation sectors that are traversable by a user of the software program;
assigning each of the identified multiple operation sectors to respective ones of multiple load groups, each load group grouping at least one operation sector for loading assets of the operation sector into memory;
assigning all assets from the multiple operation sectors into respective ones of multiple clusters based on associations between the respective assets and the multiple operation sectors;
generating and storing a memory layout that assigns one of multiple memory locations to each of the multiple clusters for at least one of the multiple load groups; and
providing, to a designer of the software program a user interface displaying memory-activity feedback about the software program using the memory layout, the memory-activity feedback provided without executing the software program.

26. The method of claim 25, wherein the method further comprises:
receiving an initial map of the multiple operation sectors, the map configured to be traversed, in execution of the software program, from a start sector through any of multiple paths to an end sector; and
generating an essentially linear map that includes each of the multiple operation sectors, the essentially linear map generated using the initial map, wherein the essentially linear map is used in assigning the multiple operation sectors to the multiple load groups.

27. The method of claim 25, wherein the method further comprises:
generating a bit field for each of the multiple assets, the bit field indicating, for each of the load groups, whether the asset is associated with that load group, wherein assigning the assets to the clusters comprises ensuring that each cluster contains only assets having identical bit fields.

28. The method of claim 25, wherein the method further comprises:
- assigning a priority value to each cluster for each of the load groups, the priority value determined based at least on relationships between the operation sectors and the assets used therein; and
- assigning a detail status to each of the clusters, the detail status indicating the cluster as being one of detail information and non-detail information;
- wherein the priority values are used in generating the memory layout; and
- wherein the detail status is used in generating the memory layout.

* * * * *